(12) United States Patent
Yamazaki

(10) Patent No.: US 6,251,011 B1
(45) Date of Patent: Jun. 26, 2001

(54) SHOOTING VIDEO GAME MACHINE AND SHOOTING RESULT PRESENTATION METHOD

(75) Inventor: Atsushi Yamazaki, Kobe (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 08/986,985

(22) Filed: Dec. 9, 1997

(30) Foreign Application Priority Data

Dec. 17, 1996  (JP) .................................................. 8-337334

(51) Int. Cl.[7] ......................................................... A63F 9/22
(52) U.S. Cl. .................. 463/2; 463/49; 463/51; 463/1; 434/17; 434/19; 434/21
(58) Field of Search .................... 463/2, 31, 49, 463/51, 52, 53; 434/17, 19, 20, 21, 22

(56) References Cited

U.S. PATENT DOCUMENTS

| | | | |
|---|---|---|---|
| 3,849,910 | * 11/1974 | Greenly | .................................... 35/25 |
| 3,960,380 | * 6/1976 | Yokoi | .................................. 273/101.1 |
| 4,290,757 | 9/1981 | Marshall et al. . | |
| 4,475,132 | 10/1984 | Rodesch . | |
| 4,639,222 | * 1/1987 | Vishlizky | ................................. 434/20 |
| 5,382,026 | 1/1995 | Harvard et al. . | |
| 5,641,288 | * 6/1997 | Zaenglein | ............................... 434/21 |

* cited by examiner

Primary Examiner—Jessica J. Harrison
Assistant Examiner—Sheila Clayton
(74) Attorney, Agent, or Firm—Jordan and Hamburg LLP

(57) ABSTRACT

A shooting video game machine comprising a mock gun having a trigger, a monitor which presents flying characters and characters other than flying characters to form a game playing display while causing a bullet to travel in a predetermined direction in synchronization of the pulling of the trigger, and a controller module comprising a game controller and a graphic controller. The graphic controller comprises a graphic processor, a character control block, a bullet control block, a hit determining block, and a proximity determining block. The hit determining block determines whether the bullet hits each of the characters, and the proximity determining block determines whether the bullet hits the proximity area of each flying character, when the hit determining block determines that the bullet hits none of the characters. When the hit determining block determines that the bullet hits a character, a strike display is presented. When the proximity determining block determines that the bullet hits the proximity area of a flying character, a smoke screen display is presented.

15 Claims, 6 Drawing Sheets

SHOOTING VIDEO GAME MACHINE AND SHOOTING RESULT PRESENTATION METHOD

BACKGROUND OF THE INVENTION

1. Field of the Invention

The present invention relates to a shooting video game machine which comprises a mock gun having a trigger and display means which presents characters on a monitor to form a game playing display while presenting a bullet travelling in a predetermined direction within the game playing display in synchronization with the pulling of the trigger. The present invention also relates to a shooting result presentation method of shooting video game for presenting a shooting result on the game playing display.

2. Description of the Related Art

Some of known video game machines are provided with a monitor screen serving as a game playing display for monitoring a character as a target and a mock gun having a trigger for shooting a pseudo-bullet to the monitor screen. When the trigger is pulled, the bullet travels in a predetermined direction within the game playing display. When the bullet hits the character, the display state of the character changes, for example, the character may be destroyed or disappear from the screen. The shooting video game machine such as this typically emits sound at the moment the bullet traveling in the screen hits the character to give presence under which a game player feels as if a real bullet hits a target.

The above conventional shooting video game machine changes the display state of the character, for example, with the character destroyed, only when the bullet shot from the mock gun hits the character as the target. The machine thus presents either a strike display or amiss display depending on the shooting result, and is monotonous and not so thrilling as a video game.

SUMMARY OF THE INVENTION

Accordingly, it is an object of the present invention to provide an exciting and thrilling shooting video game machine and shooting result presentation method.

According to a first aspect of the present invention, the shooting video game machine comprises a mock gun with a trigger, display means which presents characters on a monitor to form a game playing display while presenting a bullet travelling in a predetermined direction within the game playing display in synchronization with the pulling of the trigger, proximity determining means for determining that the bullet hits a proximity area of each character and shooting result display means for presenting a shooting result within the game playing display when the proximity determining means determines that the bullet hits the proximity area of the character.

With this arrangement, the characters are presented on the monitor to form the game playing display. The mock gun is positioned in front of the monitor screen and its trigger is pulled with the mock gun aimed at the monitor screen. When the trigger is pulled, the bullet is presented on the game playing display, and travels in the predetermined direction. The direction of travel of the bullet on the game playing display is predetermined depending on the point of impact on the monitor screen as the display means.

In order to determine the point of impact, an area sensor arranged in the vicinity of the muzzle of the gun picks up light from a point light source arranged at a predetermined position near the game playing display and the position on the monitor screen where the gun is aimed at is computed from the image position of the point light source in the image pickup area of the sensor. Alternatively, the point of impact may be determined by using a photosensitive device arranged at the muzzle of the gun to obtain the timing of a scanning line in raster scan. A proximity determination is made concerning the bullet traveling on the game playing display to determine whether the bullet hits the proximity area of the character within the game playing display. More particularly, when the game playing display is presented pseudo-three-dimensionally using polygons, a predetermined area surrounding the bullet formed of polygons and the character formed of polygons, namely the three-dimensional coordinates of the proximity area of the character and of the bullet are computed for a match to perform a proximity determination. When it is determined that the bullet hits the proximity area of the character, a predetermined shooting result such as a blast of the bullet is presented. In case of a two-dimensional presentation, a match is two-dimensionally determined.

According to a second aspect of the present invention, the characters include flying characters and characters other than the flying characters, and the proximity determining means determines whether the bullet hits the proximity area of each flying character.

In the second aspect, the three-dimensional coordinates of the predetermined proximity area of the flying character and of the bullet are computed for a match to perform proximity determination. When it is determined that the bullet hits the proximity area of the character, a predetermined shooting result such as a blast of the bullet is presented.

According to a third aspect of the present invention, the shooting video game machine comprises hit determining means for determining whether the bullet hits each of the characters on the game playing display, wherein the proximity determining means determines whether the bullet hits the proximity area of each flying character when the hit determining means determines that the bullet hits none of the characters, and wherein the shooting result display means causes a strike display to be presented when the hit determining means determines that the bullet hits any of characters and causes a smoke screen display to be presented when the proximity determining means determines that the bullet hits the proximity area of any of the flying characters.

In the third aspect, when the game playing display is presented pseudo-three-dimensionally using polygons, the three-dimensional coordinates of the faces of all on-screen polygons and the polygon of the bullet are computed for a match to determine a hit. When any polygons match, the character constituted by that polygon is subjected to a hit processing. When no polygons match, a determination is made of whether that polygon is of the flying character. When it is determined that the polygon is of the flying character, the three-dimensional coordinates of the predetermined proximity area of the flying character and the bullet are computed for a match to determine proximity. When it is determined that the bullet hits the proximity area of the flying character, the bullet blasts, causing a smoke screen display to be presented.

According to a fourth aspect of the present invention, the shooting result display means causes the flying character to change to the strike display when the proximity determining means determines that a predetermined plural number of bullets hit the same flying character.

In the fourth aspect, when proximity hits to the same flying character exceed a predetermined count, the display process substantially identical to that for a flying character hit is performed to give a variation in the shooting result.

According to a fifth aspect of the present invention, the characters other than the flying characters include characters fixed to the ground and characters moving on the ground, and the flying characters are the ones flying in the air.

In the fifth aspect, a proximity hit processing is performed to the flying character that flies in the air, and the characters other than the flying characters are subjected to standard hit processing only. This arrangement offers presence to a game player.

According to a sixth aspect of the present invention, the bullet shooting is repeated by the mock gun at predetermined intervals while the trigger is continuously pulled.

With this arrangement, a gun, such as a repeating rifle, likely to cause a proximity hit is mocked.

According to a seventh aspect of the present invention, the shooting result presentation method of a shooting video game machine which presents characters on a monitor to form a game playing display while presenting a bullet travelling in a predetermined direction within the game playing display in synchronization with the pulling of the trigger, comprises the step of determining that the bullet hits a proximity area of each character and the step of presenting a shooting result within the game playing display when it is determined that the bullet hits the proximity area of the character.

With this arrangement, a proximity hit determination is performed to the bullet traveling on the game playing display to determine whether the bullet hits the proximity area of the character. When the game playing display is presented pseudo-three-dimensionally using polygons, the three-dimensional coordinates of a predetermined area surrounding the character formed of polygons and the bullet formed of polygons are computed for a match to perform proximity determination. When it is determined that the bullet hits the proximity area of the character, a predetermined shooting result such as a blast of the bullet is presented.

According to an eighth aspect of the present invention the characters include flying characters and characters other than the flying characters, and the characters that are considered in the determination of whether the bullet hits are the flying characters.

In the eighth aspect, the three-dimensional coordinates of the predetermined proximity area of the flying character and of the bullet are computed for a match to perform proximity determination. When it is determined that the bullet hits the proximity area of the character, a predetermined shooting result such as a blast of the bullet is presented.

According to a ninth aspect of the present invention, the shooting result presentation method of a shooting video game comprises the step of determining whether the bullet hits each of the characters on the game playing display prior to the determination of whether the bullet hits the proximity area of each flying character, the step of determining whether the bullet hits the proximity area of the flying character when it is determined that the bullet hits none of the characters, and the step of causing a strike display to be presented when it is determined that the bullet hits any of the characters and causing a smoke screen display to be presented when it is determined that the bullet hits the proximity area of the flying character.

In the ninth aspect, when the game playing display is presented pseudo-three-dimensionally using polygons, the three-dimensional coordinates of the faces of all on-screen polygons and the polygon of the bullet are computed for a match to determine a hit. When any polygons match, the character constituted by that polygon is subjected to a hit processing. When no polygons match, a determination is made of whether that polygon is of the flying character. When it is determined that the polygon is of the flying character, the three-dimensional coordinates of the predetermined proximity area of the flying character and the bullet are computed for a match to determine proximity. When it is determined that the bullet hits the proximity area of the flying character, the bullet blasts, causing a smoke screen display to be presented.

According to a tenth aspect of the present invention, a strike display is presented when the proximity determining means determines that a predetermined plural number of bullets hit the same flying character by a predetermined count.

In the tenth aspect, when proximity hits to the same flying character exceed a predetermined count, the display process substantially identical to that for a flying character hit is performed to give a variation in the shooting result.

DESCRIPTION OF THE PREFERRED EMBODIMENTS

Figure 1:
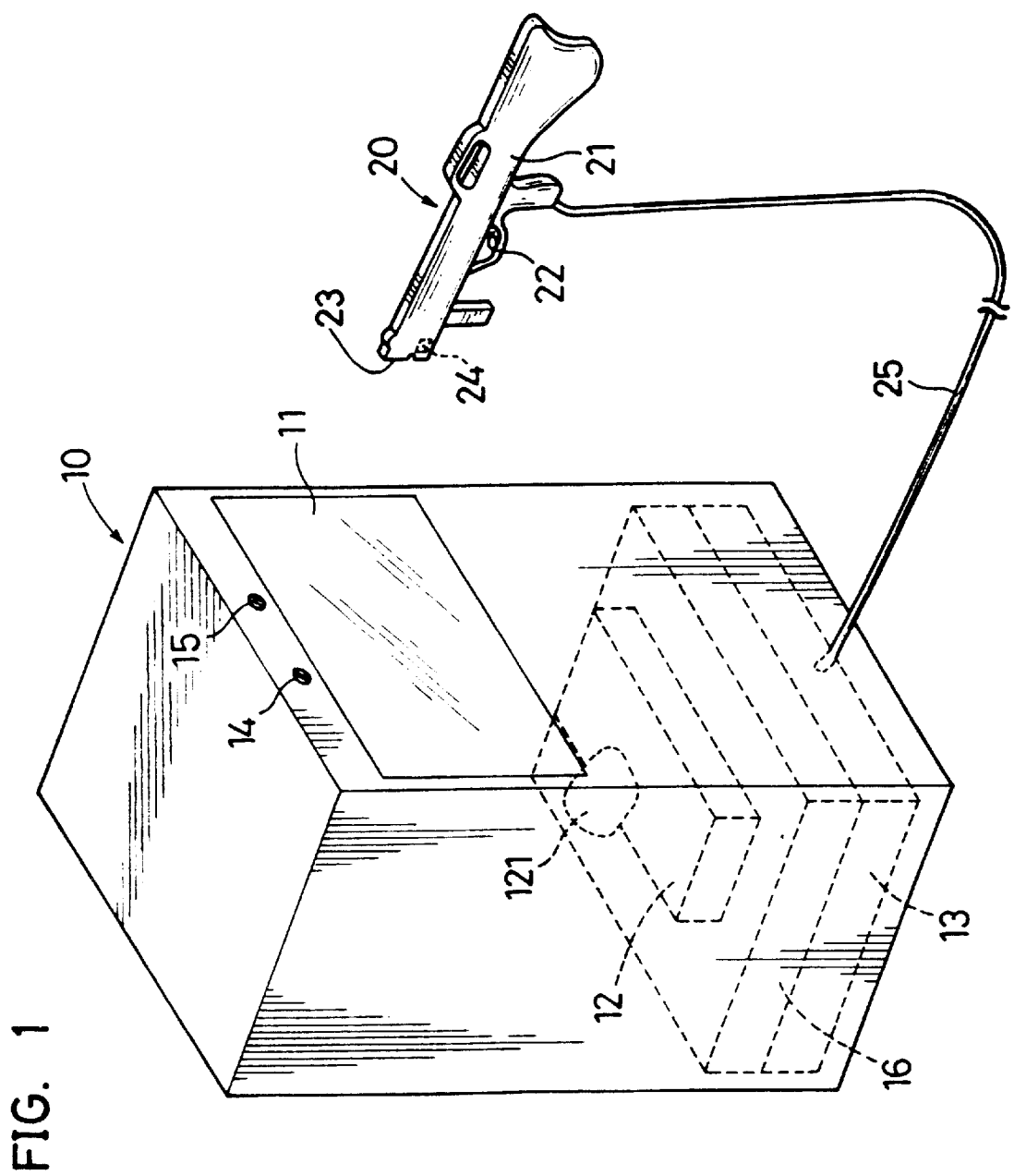
FIG. 1 is a perspective view showing diagrammatically one embodiment of shooting video game machine of the present invention.

FIG. 1 is a perspective view showing diagrammatically one embodiment of shooting video game machine of the present invention. As shown, the shooting video game machine comprises a game machine main unit 10 and a mock gun 20.

The game machine main unit 10 comprises a monitor screen 11, a projector module 12 for projecting a game playing display on to the monitor screen 11, and a controller module 13 which makes a game proceed according to a predetermined program and a shooting result of the mock gun 20 while sending an image signal to the projector module 12. The game machine main unit 10 further comprises light sources 14, 15 of infrared LEDs that are arranged at predetermined positions above the top edge of the monitor screen 11 and that emit infrared spot light having a wavelength outside the visible light region, and a position detector module 16, arranged near the controller module 13, for detecting the point of impact of the bullet shot from the mock gun 20. The game machine main unit 10 further comprises a coin entry slot and a start switch, though they are not shown in FIG. 1.

In the game machine main unit 10 thus constructed, the game playing display is projected by a projector 121 of the projector module 12, reflected by an unshown mirror arranged on the rear inside portion of the game machine main unit 10, and then directed onto the monitor screen 11 on the upper front portion of the game machine main unit 10. The light sources 14, 15 above the monitor screen 11 are driven by an LED driver circuit to emit infrared light. If they do not interfere game playing, the light sources 14, 15 may be arranged on the top inner area of the monitor screen 11.

The mock gun 20 comprises a trigger 22 on the underside of a gun body 21 and an image pickup device 24 of CCD (charge coupled device) area sensor, arranged on the lower portion of the muzzle 23 of the gun 20 and having a sufficiently high sensitivity in the infrared region. The mock gun 20 is connected via a cable 25 to the controller module 13 and position detector module 16 in the game machine main unit 10. When the trigger 22 of the mock gun 20 is pulled, it issues a trigger signal to the controller module 13 via the cable 25. The controller module 13 generates bullet firing pulses in succession at predetermined intervals (for example, 10 pulses/s) as long as the trigger 22 is pulled, and with this arrangement, a game player is under the impression that the bullets are fired in succession from the muzzle 23. The image pickup device 24 comprises on its front a filter which transmits light in a predetermined long-wavelength region only to prevent erroneous detection of external light, and an imaging lens for focusing an image on the light-receiving face of the image pickup device 24, though these elements are not shown in FIG. 1.

In the mock gun 20 thus constructed, the image pickup device 24 constantly monitors infrared spot light beam from the light sources 14, 15, and sends the image data of the infrared spot light beam to the position detector module 16 via the cable 25. Based on the image data, the position detector module 16 computes the point of impact where the bullet electronically fired from the muzzle 23 meets the monitor screen 11. The point of impact is computed based on the image position of the infrared spot light beam within the image pickup area of the image pickup device 24 constructed of CCD area sensor. Regardless of the firing of the bullet, the computation of the point of impact is performed each time the game playing display is refreshed (for example, every 1/30 second). When the trigger 22 is pulled, the controller module 13 collects impact point data every predetermined unit time (for example, each time a bullet firing pulse is output, namely 10 times a second), and the bullet is presented on the monitor screen 11. The bullet is designed to travel in a predetermined direction on the monitor screen 11 in accordance with the point of impact.

The direction of travel of the bullet is determined by the point of impact. For example, when the player plays at an approximately central position in front of the monitor screen 11, the bullet travels in substantially the same direction as the muzzle of the gun faces. More particularly, when the player fires the bullet with the gun facing the center of the monitor screen 11, the bullet travels straight from the point of impact at the center of the monitor screen 11 (in a horizontal direction within the game playing display). When the point of impact is not at the center of the monitor screen 11, the bullet travels from the point of impact leftward to the left edge or rightward to the right edge of the monitor screen 11. Upward and downward motions may be optionally included in the direction of travel of the bullet.

The mock gun is provided with a photosensitive device such as a photodiode. The trigger pulling causes the scan line to be visibly presented on the monitor screen and thereby a white-state display to be presented thereon. The photosensitive diode receives light of the white-state display in raster scan. The point of impact is computed based on the time difference between the start of raster scan and the timing of light reception by the photosensitive device.

Figure 2:
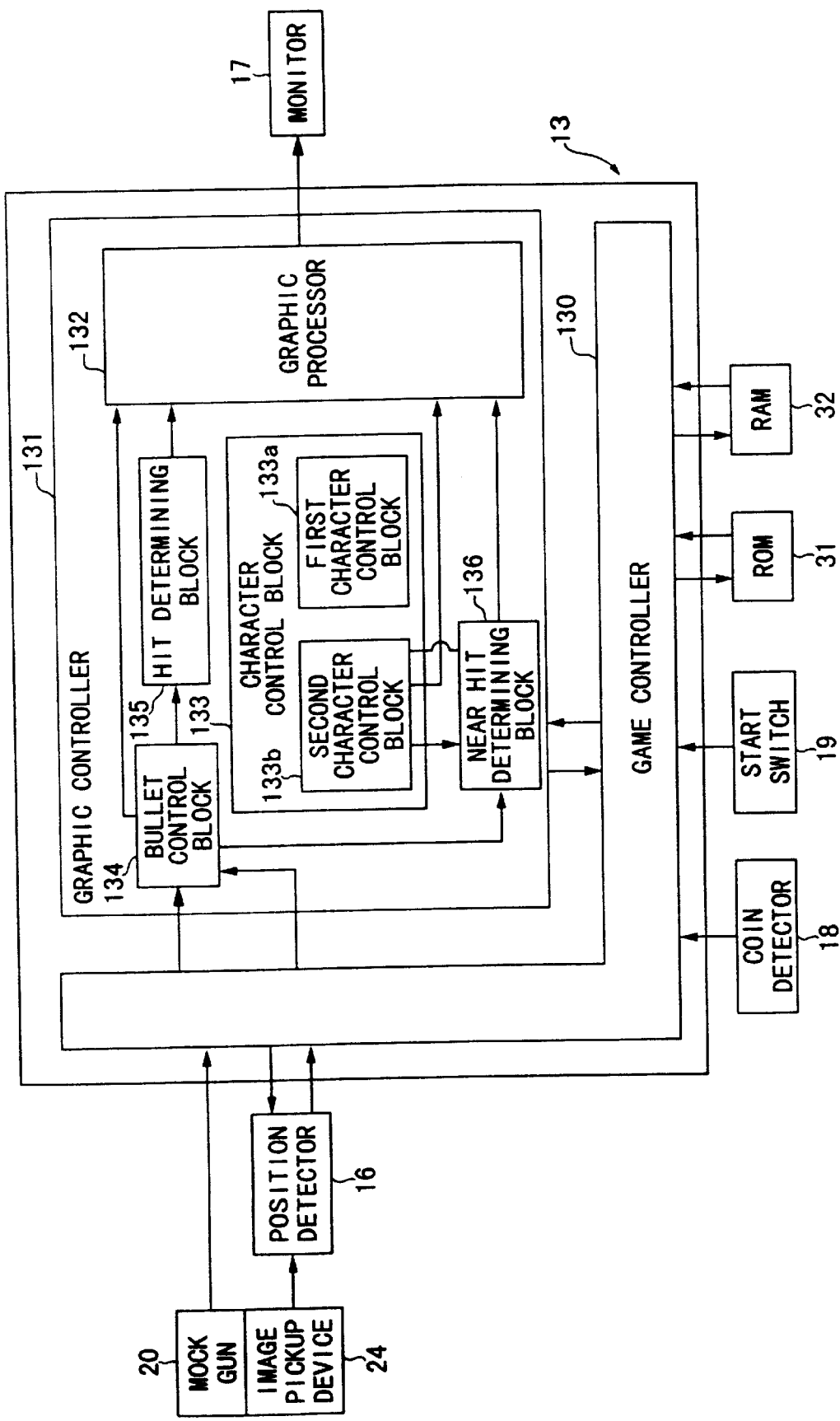
FIG. 2 is a block diagram of the control system of the shooting video game machine of FIG. 1.

FIG. 2 is a block diagram of the control system of the shooting video game machine of FIG. 1. As shown, the control system comprises the controller module 13, position detector module 16, mock gun 20, monitor 17 constructed of the monitor screen 11 and projector module 12, coin detector 18, start switch 19, ROM 31 and RAM 32.

The controller module 13, having a CPU or the like, includes a game controller 130 and a graphic controller 131.

The game controller 130 modifies the view point of the game playing display and controls the general game playing operation of under the control of a program stored in ROM 31. In response to the presence or absence of a detected signal from the coin detector 18, the game controller 130 determines whether a coin is inserted into the coin entry slot. In response to the presence or absence of a signal from the start switch 19, the game controller 130 determines whether the start switch 19 is pressed.

ROM 31 stores the program for generally controlling game playing (for example, moving the viewpoint of the game playing display and each character), a program for controlling the display, coordinate data of each apex of a polygon for presenting a character on the monitor screen 11 and color data of texture, and sound effects data for firing sound, hit, proximity hit. RAM 32 stores temporarily data being processed.

The graphic controller 131 comprises a graphic processor 132, a character control block 133, a bullet control block 134, a hit determining block 135 and a proximity determining block 136.

The graphic processor 132 is used to draw fixed characters such as the ground, trees, roads, and buildings, moving characters, such as jeeps and tanks, moving on the ground (hereinafter referred to as moving characters), characters, such as helicopters and airplanes, flying in the air (hereinafter referred to as flying characters), and bullets that are presented as if they are fired from the mock gun 20. The graphic processor 132 performs predetermined processes in response to drawing commands from the game controller 130.

Available as drawing commands are a drawing command for drawing cubically a three-dimensional image using polygons, and a drawing command for drawing a two-dimensional image. A polygon is a two-dimensional polygonal image, and is in this embodiment, a triangle or a tetragon.

The drawing command for drawing a cubical image is constituted by apex address data of a polygon in ROM 31, texture address data indicative of the memory location of texture data attached onto the polygon in a buffer, color palette address data indicative of the memory location of color palette data representing the color of texture data in ROM 31, and luminance data indicative of luminance of texture.

Among these data, the polygon apex address data is obtained by coordinate-transforming polygon apex coordinate data in a three-dimensional space to polygon apex coordinate data in a two-dimensional space based on translation quantity data and rotation quantity data of the image itself. The graphic processor 132 writes texture data corresponding to display area of RAM 32 represented by three or four pieces of polygon apex address data.

Each character is formed of a number of polygons. The graphic processor 132 stores, in RAM 32, coordinate data of each polygon in three-dimensional space. When a character is translated on the monitor screen 11 according to a predetermined program, the following process is carried out. The graphic processor 132 determines sequentially three dimensional data of polygons after translation and rotation of each polygon based on three-dimensional data of the apexes of each polygon stored in RAM 32 and translation quantity data and rotation quantity data of each polygon. Of the three dimensional data of the polygon thus determined, coordinate data in a horizontal direction and a vertical direction is handled as address data on the display area of RAM 32, namely, polygon apex address data. The graphic processor 132 writes texture data designated by pre-assigned texture address data onto the display area of RAM 32 represented by three or four pieces of polygon apex address data. In this way characters (fixed characters, moving characters, flying characters and the like) formed of a number of polygons with texture data attached thereon are presented on the monitor screen 11.

The drawing command for drawing an ordinary two-dimensional image is constituted by apex address data, texture address data, color palette address data indicative of the memory location of color palette data representing the color of texture data in ROM 31, and luminance data indicative of luminance of texture. Of these data, the apex address data is coordinate data that is obtained by coordinate-transforming apex address data in two dimensional plane according to translation quantity data and rotation quantity data.

The character control block 133 comprises a first character control block 133a and a second character control block 133b. The first character control block 133a reads apex coordinate data, translation quantity data and rotation quantity data of each of polygons constituting the fixed characters and the moving characters stored in ROM 31, and sends them to the graphic processor 132. The second character control block 133b reads apex coordinate data, translation quantity data and rotation quantity data of each of polygons constituting the flying characters stored in ROM 31, and sends them to the graphic processor 132. Based on these data, the graphic processor 132 presents the fixed characters, moving characters and flying characters on the monitor screen 11.

Both the first character control block 133a and second character control block 133b also output the apex coordinate data, translation quantity data and rotation quantity data of the polygons to the hit determining block 135. The second character control block 133b further outputs the apex coordinate data, translation quantity data and rotation quantity data of the polygons to the proximity determining block 136. The moving characters and the flying characters serve as a target for the mock gun 20.

The bullet control block 134 reads the apex coordinate data of the polygons constituting a bullet stored in ROM 31 every predetermined unit time (for example, each time a bullet firing pulse is output, namely 10 times a second). Furthermore the bullet control block 134 computes beforehand the position of the bullet fired by the mock gun 20 for each game playing display (frame display) (in trajectory simulation), based on the impact point data of the bullet of the mock gun 20 computed by the position detector module 16, the direction of travel of the bullet determined beforehand in accordance with the impact point (for example, the direction data is tabled in accordance with impact point in memory), and the predetermined speed of bullet (Mach number 3, for example). The bullet control block 134 outputs the position data of the bullet to the graphic processor 132, hit determining block 135 and proximity determining block 136. The graphic processor 132 carries out predetermined drawing or graphic process to present the bullet on the monitor screen 11 for each game playing display.

As long as the trigger is continuously pulled in this embodiment, a plurality of bullets are fired in succession with one bullet every predetermined unit time (10 times a second, for example). A plurality of bullets are presented in the same game playing display. Each time the game playing display is refreshed the trajectory simulation is carried out so that a bullet that hits or nears a character earlier is identified.

The hit determining block 135 determines whether the position of each bullet matches the positions of the fixed characters, moving characters and flying characters, namely whether each bullet hits any of the fixed characters, moving characters and flying characters. When the hit determining block 135 determines that there is a match between them, it sends a match signal concerning the bullet to the graphic processor 132. The graphic processor 132 presents on the monitor screen 11 a smoke screen that is caused by the blast of the bullet, based on the apex coordinate data of the polygons which the character control block 133 reads from ROM 31. The graphic processor 132 also presents in its destroyed form the character hit by the bullet or makes the character hit by the bullet disappear from the game playing display.

The shooting result is presented by changing the game playing display at the moment any of the characters is hit by the bullet. In the present invention, a strike display refers to the display in which the character hit by the bullet is changed into a destroyed one or disappears from the game playing display.

In order to allow the hit determining block 135 to carry out a hit determination, the first character control block 133a and second character control block 133b send the position data of each character in each game playing display to the hit determining block 135 while the bullet control block 134 sends the position data of each bullet in each game playing display to the hit determining block 135. The hit determining block 135 determines beforehand whether each bullet matches or hits any of the characters in each game playing display. When the hit determining block 135 determines that the bullet hits a moving character or a flying character, the hit determining block 135 sends to the graphic processor 132 a match signal of the bullet that matches first the character. When the hit determining block 135 determines that any bullet matches or is close to a fixed character, the hit determining block 135 sends to the graphic processor 132 match signals of game playing displays concerning all bullets which hit the fixed character or are close to the character. Upon receiving the match signal, the graphic processor 132 presents the shooting result representing the character hit by the bullet.

When the hit determining block 135 determines that the bullet hits none of the characters, the proximity determining block 136 determines whether the position of each bullet matches a position within a predetermined proximity area surrounding the flying character (considering only the side of the flying character to which the bullet comes is acceptable), namely whether each bullet is close to the flying character. The proximity determining block 136 computes position data defining the predetermined proximity area based on the position data of the flying character, and compares the position data defining the predetermined proximity area with the position data of the bullet to determine a proximity.

When the proximity determining block 136 determines that the bullet nears the flying character, a proximity signal is sent to the graphic processor 132. The graphic processor 132 presents on the monitor screen 11 a smoke screen caused by a proximity blast (proximity explosion), based on the apex coordinate data of the polygons which the character control block 133 reads from ROM 31. Furthermore the graphic processor 132 presents one character display in which the flying character is partly damaged, for example, with its wings stripped, or another character display in which the flying character goes into a tailspin, when a predetermined number of bullets near the same flying character in succession causing the proximity signals to be consecutively issued. When the proximity signals are consecutively issued, the flying character may be changed in color or its configuration may be gradually changed.

Instead of the smoke screen arising from the proximity blast when the bullet is close to the flying character, the flying character only may be damaged as described above. If bullets consecutively fail to near the same flying character within a predetermined duration of time during which the trigger is continuously pulled, the character may be recovered from its damaged state.

The shooting result is presented by changing the game playing display at the moment of the proximity. In the present invention, the smoke screen display refers to the display in which a smoke screen is presented on the monitor screen 11 when the bullet nears the flying character. In game playing the proximity blast (explosion) mocks the function of the proximity fuse that is employed in actual weapons in which a bullet blasts itself at the moment it detects its entry into a predetermined range of a target.

To allow the proximity determining block 136 to perform the hit determination, the second character control block 133b sends the position data of the flying character in each game playing display to the proximity determining block 136 while the bullet control block 134 sends the position data of each bullet to the proximity determining block 136. Concerning all bullets, the proximity determining block 136 determines beforehand whether any bullet nears the flying character in any game playing display. When it determines that any bullet nears the flying character, a proximity signal of a game playing display where any bullet nears first the flying character or a proximity signal of a game playing display where any bullet nears mostly closely the flying character is sent to the graphic processor 132. The graphic processor 132 presents the shooting result representing the flying character neared by the bullet, in response to the proximity signal.

Figure 3:
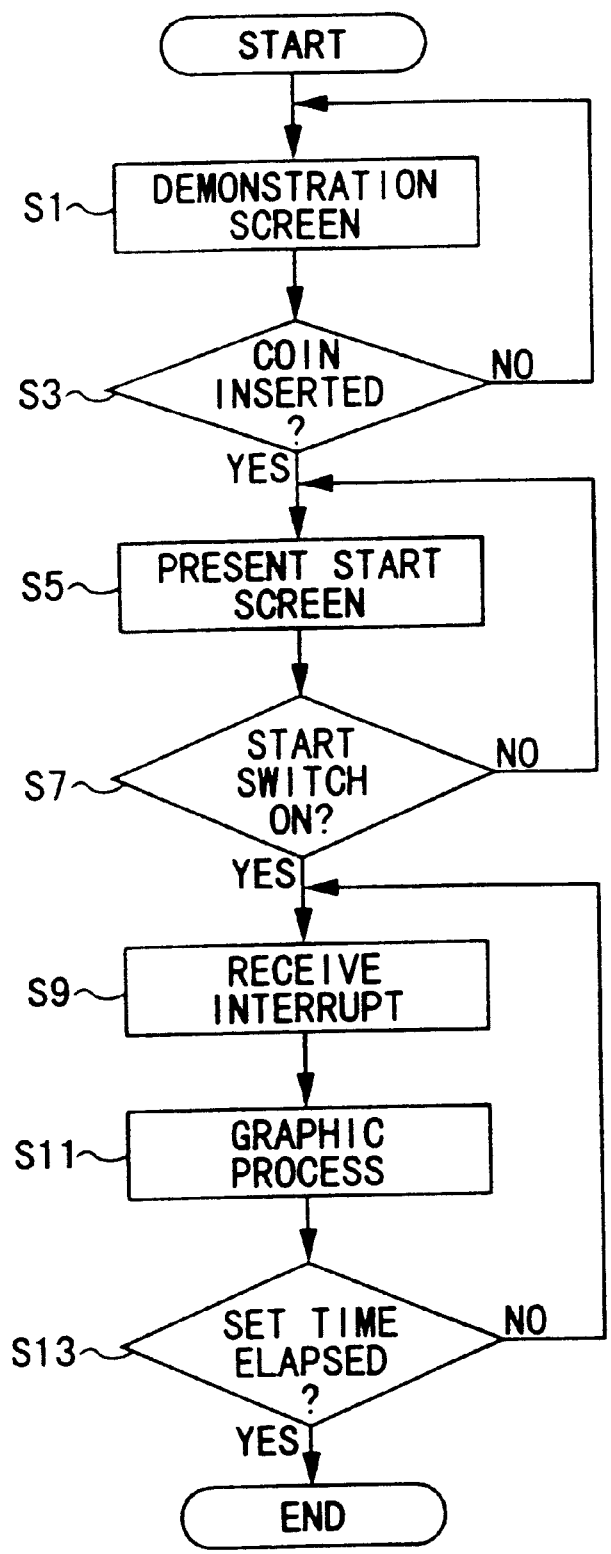
FIG. 3 is a flow diagram illustrating the operation of the shooting video game machine of FIG. 1.

The operation of the shooting video game machine is now discussed referring to a flow diagram shown in FIG. 3.

Upon power up, the graphic processor 132 presents a demonstration display on the monitor screen 11 (step S1). A determination is made of whether a coin is put into the coin entry slot (step S3). When no coin is put into the coin entry slot (NO in step S3), the demonstration display in step S1 is continuously presented on screen. When a coin is put into the slot (YES in step S3), the graphic processor 132 presents a start display (step S5).

Figure 4:
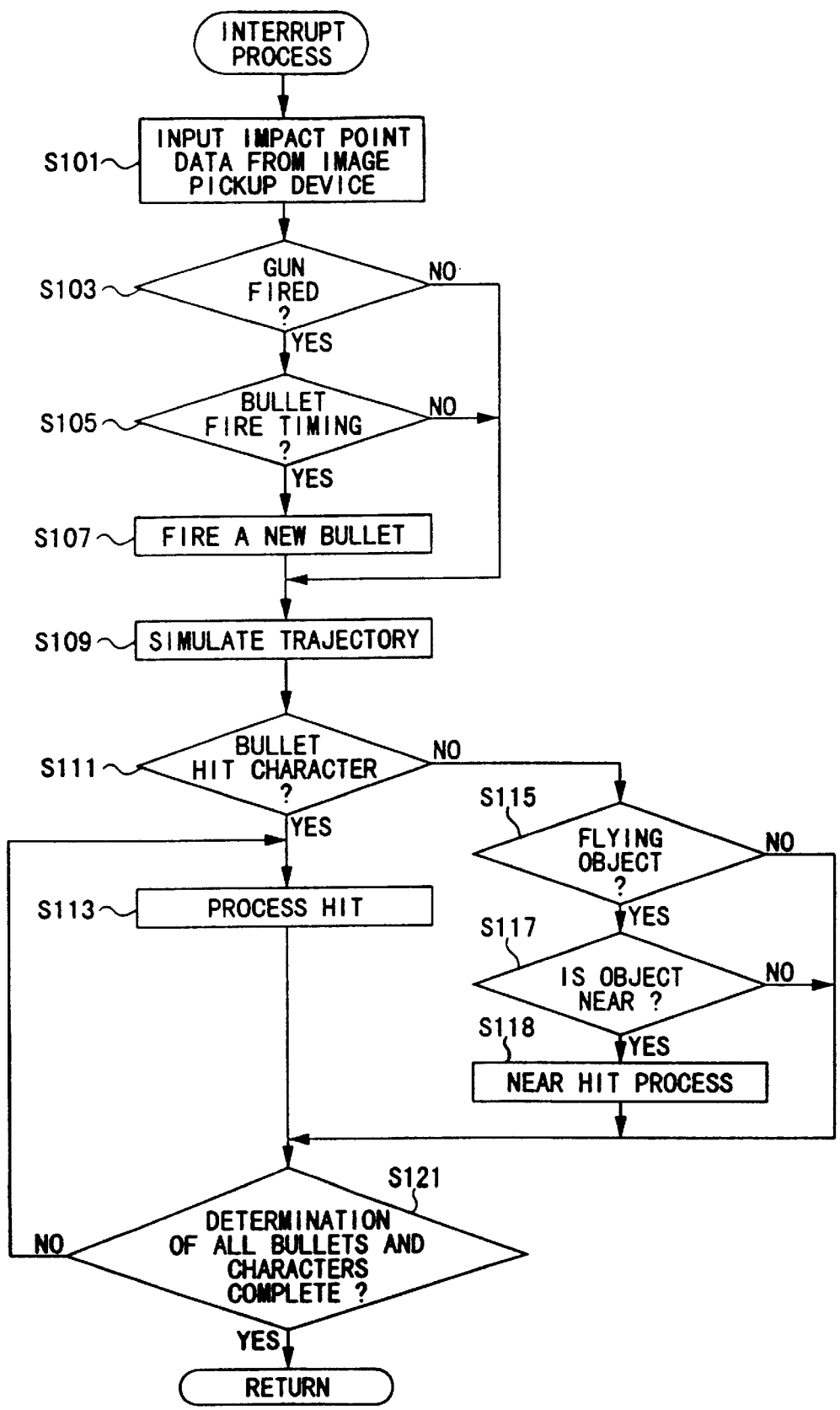
FIG. 4 is a flow diagram illustrating the interrupt process in the flow diagram of FIG. 3.

A determination is made of whether the start switch 19 is pressed (step S7). When the start switch 19 is not pressed (NO in step S7), the start display in step S5 is continuously presented on screen. When the start switch 19 is pressed (YES in step S7), an interrupt is permitted every unit time (every ⅟30 second, for example, and it is noted that the game playing display is refreshed every ⅟30 second) from the start of game playing (step S9). An interrupt process illustrated in a flow diagram shown in FIG. 4 is now performed.

Figure 5:
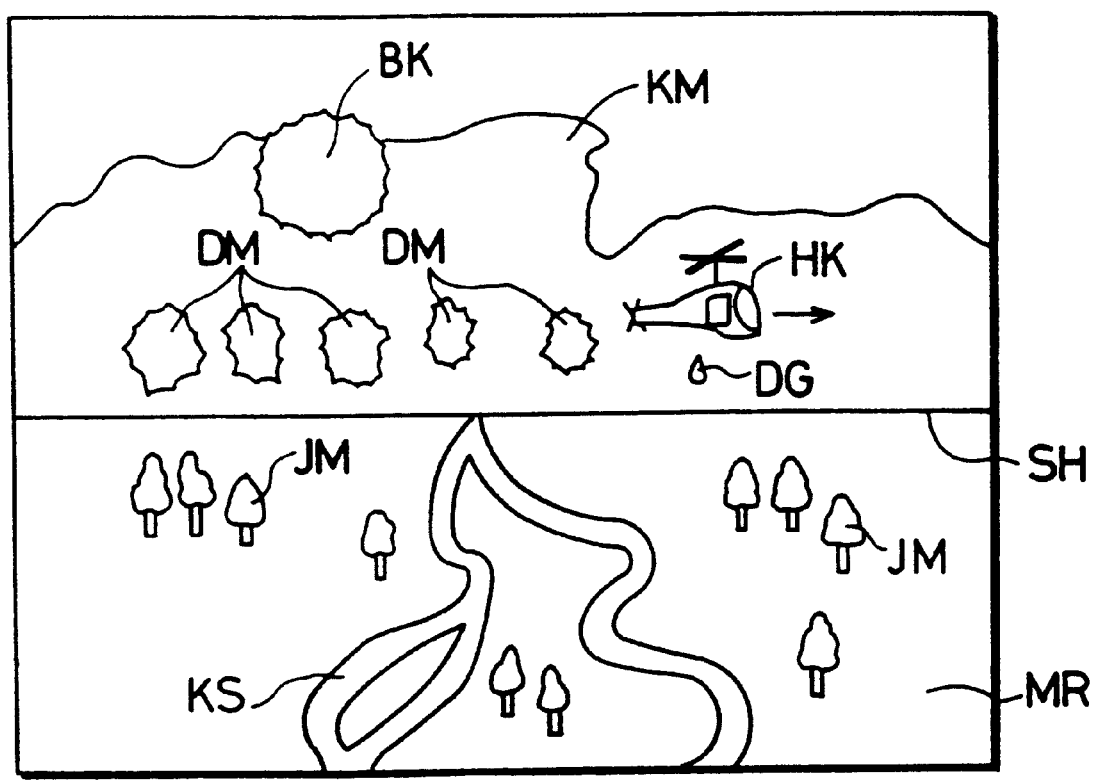
FIG. 5 is an example of game playing display presented on the shooting video game machine of FIG. 1.
Figure 6:
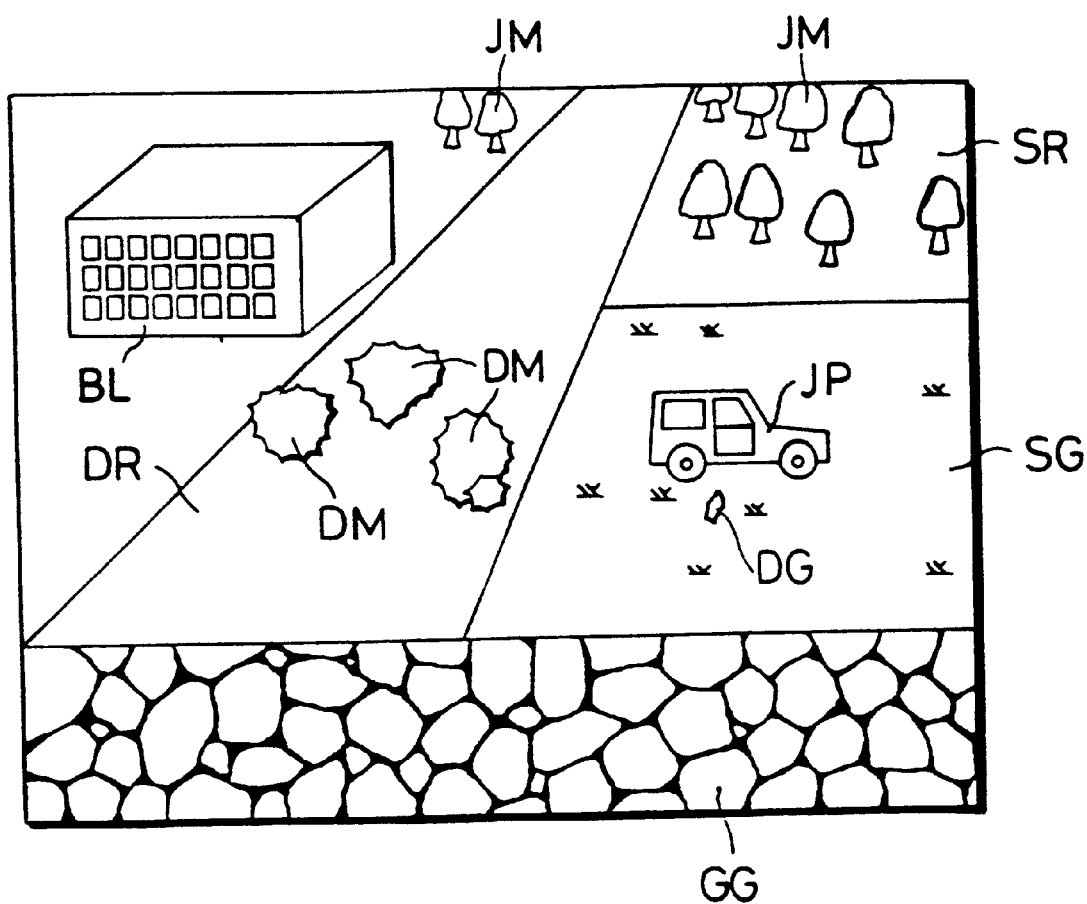
FIG. 6 is an example of game playing display presented on the shooting video game machine of FIG. 1.

When a game playing starts, a game playing display is presented on the monitor screen 11 as shown in FIGS. 5 and 6.

Referring to FIG. 5, bullets are fired at a helicopter that is flying above a thick forest. The thick forest MR with trees JM flourishing therewithin is presented entirely over the lower portion of the screen below the horizon SH shown at the middle of the screen, and rivers KS run through the center of the forest MR. A cloud KM is shown above the horizon SH, and the helicopter HK is flying rightward from the left side of the screen above the thick forest. DM represents a smoke screen that is caused by the blast of a bullet fired by the mock gun. BK represents the state of explosion that was caused when a bullet hit another helicopter flying in the, upper left portion of the screen. DG represents a bullet that is fired at the helicopter HK on the right-hand side.

FIG. 6 shows a game playing display where bullets are fired at a jeep running on the ground. A pavement DR runs from a sea wall GG on the lower portion of the screen toward a forest SR with trees JM flourishing therewithin on the upper portion of the screen. A building BL is situated on the left along the pavement DR. A grass plot SG is presented in front of the forest SR. The jeep JP is now running rightward into the grass plot SG from the pavement DR. DMs represent smoke screens that are caused by the blast of bullets that are fired at the jeep JP from the mock gun and hit the ground. DG is a bullet fired at the jeep JP on the right-hand side.

The interrupt process illustrated in the flow diagram in FIG. 4 is now discussed. When an interrupt is permitted in step S9 (FIG. 3), the impact point data of the bullet from the mock gun 20 computed by the position detector module 16 is input to the bullet control block 134 (step S101). A determination is made of whether the trigger 22 of the mock gun 20 is pulled (step S103). When the trigger 22 is pulled (YES in step S103), the game controller 130 determines whether it is now a bullet firing timing (step S105). When it is a bullet firing timing (YES in step S105), a new bullet is fired (step S107).

The position of each fired bullet in each game playing display is beforehand computed (step S109). Since one bullet fired prior to another is present in each game playing display, the positions of the bullets in each game playing display are beforehand computed. A determination is sequentially made of whether each bullet directly hits any of the helicopter HK and trees JM shown in FIG. 5 or the pavement DR, building BL, trees JM, and jeep JP shown in FIG. 6 (step S111). When any bullet hits any of them (YES in step S111), the hit processing concerning the bullet that successfully hits is performed (step S113).

The hit processings include the processing in which the character control block 133 reads the polygon apex coordinate data from ROM 31 to present on screen the tree JM with its branches broken away and falling on the ground when the tree JM is hit. The hit processings also include the processing in which the character control block 133 reads the polygon apex coordinate data from ROM 31 to present on screen the smoke screen DM resulting from the blast of the bullet when the pavement DR is hit. Furthermore when the helicopter HK is hit, the character control block 133 reads the polygon apex coordinate data from ROM 31 to present on screen the helicopter HK falling. When the jeep JM is hit, the character control block 133 reads the polygon apex coordinate data from ROM 31 to present on screen the jeep JP being destroyed. The hit processings also include reading sound data for sound effects from ROM 31 in response to the hitting of the bullet against the character and reading image data from ROM 31 to present game scores on the monitor screen.

When no bullet hits the character (NO in step S111), a determination is made of whether the character suffering no hit is a flying one (the helicopter HP in this embodiment) (step S115). When it is the helicopter HP (YES in step S115), a determination is made of whether the bullet is close to the helicopter HP (within the predetermined proximity area surrounding the helicopter) (step S117). When the bullet is close to the helicopter HP (YES in step S117), the proximity hit processing concerning the bullet in proximity is performed (step S119).

The proximity hit processing refers to the processing in which the character control block 133 reads the polygon apex coordinate data from ROM 31 to present on screen the smoke screen DM in the proximity blast that takes place when the bullet nears the helicopter HP.

The game controller 130 determines (in step S121) that determination has been made in connection with all bullets and all characters, subsequent to the hit processing in step S113, the proximity hit processing in step S119, the determination in step S115 that the character is not the helicopter, and the determination in step S117 that the bullet is not close to the helicopter. When the determination in connection with all bullets and all characters is not completed (NO in step S121), the process returns to step S111 to repeat the above-described steps. When all bullets and all characters are completed (YES in step S121), the process returns to the flow diagram shown in FIG. 3.

When the process returns to the flow diagram shown in FIG. 3 subsequent to the hit processing in step S113, the graphic processing is performed in accordance with the hit processings (step S11), and the shooting result representing the bullet hitting the character in the respective game playing display is presented. When the process returns to the flow diagram shown in FIG. 3 subsequent to the proximity hit processing, the graphic processing is performed in accordance with the proximity hit processing (step S11), and the shooting result representing the bullet proximity blasting in the respective game playing display is presented. In this embodiment, the same helicopter HP suffers proximity blasts for a predetermined number of times in succession, the helicopter is partly damaged and crashes into the ground as already described.

When the trigger 22 of the mock gun 20 is not pulled in step S103, or when it is not a bullet firing timing in step S105, steps S109 through S121 are carried out in connection with the bullets fired in the previous interrupt process cycle.

Returning to the flow diagram shown in FIG. 3, the interrupt process in step S9 ends, and the graphic process in step S11 ends, and it is determined (in step S13) whether a predetermined set time elapses from the start of the game. When the set time is not up (NO in step S13), the process returns to step S9 for a next interrupt process cycle. When the set time is up (YES in step S13), the game ends.

Since the shooting video game and the shooting result presentation method of shooting game are arranged as described above, the shooting game is more thrilling. Not only when the bullet fired from the mock gun 20 directly hits the character but also when the bullet nears the character without directly hitting it, the bullet blasts (in a proximity blast). When the same character is neared by bullets and suffers proximity blasts a predetermined count in succession, the character may crash into the ground or may be destroyed. The predetermined count may be appropriately set to adjust the level of skill in game playing.

In the above embodiment, the game machine main unit 10 projects the game playing display from the projector module 12 to the monitor screen 11. Alternatively, the game playing display may be directly presented on a CRT or LCD. The gun is of a repeating rifle type which consecutively fires bullets as long as the trigger of the mock gun 20 is continuously pulled. The gun may be of a single-shot rifle type which fires a single bullet each time the trigger is pulled.

In the above embodiment, both the hit determination and proximity hit determination are performed. Alternatively, the game playing may be arranged using the proximity hit determination only. In this case, thrill in game playing is enhanced by a variety of displays of shooting results such as the character crashing into the ground or damaged when the same character is neared by bullets a predetermined count in succession.

In the above embodiment, the characters are presented on the ground or in the air. Alternatively, characters may be presented at sea or under water. Such vehicles may be handled in the same way as the flying objects.

The shooting video game machine of the present invention comprise the mock gun with the trigger, display means which presents characters on the monitor to form the game playing display while presenting the bullet travelling in the predetermined direction within the game playing display in synchronization with the pulling of the trigger, proximity determining means for determining that the bullet hits the proximity area of each character and shooting result display means for presenting the shooting result within the game playing display when the proximity determining means determines that the bullet hits the proximity area of the character. With this arrangement, game playing is made exciting and thrilling.

According to the shooting video game machine of the present invention, the characters include flying characters and characters other than the flying characters, and the shooting video game machine comprises hit determining means for determining whether the bullet hits each of the characters on the game playing display, wherein the proximity determining means determines whether the bullet hits the proximity area of each flying character when the hit determining means determines that the bullet hits none of the characters, and wherein the shooting result display means causes the strike display to be presented when the hit determining means determines that the bullet hits any of characters and causes the smoke screen display to be presented when the proximity determining means determines that the bullet hits the proximity area of any of the flying characters. With this arrangement, game playing is made exciting and thrilling.

According to the shooting result presentation method of shooting video game machine which presents characters on the monitor to form the game playing display while presenting the bullet travelling in the predetermined direction within the game playing display in synchronization with the pulling of the trigger, the method comprises the step of determining that the bullet hits the proximity area of each character and the step of presenting the shooting result within the game playing display when it is determined that the bullet hits the proximity area of the character. With this arrangement, game playing is made exciting and thrilling.

The shooting result presentation method of a shooting video game comprises the step of determining whether the bullet hits each of the characters on the game playing display prior to the determination of whether the bullet hits the proximity area of each flying character, the step of determining whether the bullet hits the proximity area of the flying character when it is determined that the bullet hits none of the characters, and the step of causing a strike display to be presented when it is determined that the bullet hits any of the characters and causing a smoke screen display to be presented when it is determined that the bullet hits the proximity area of the flying character. With this arrangement, game playing is made exciting and thrilling.

What is claimed is:

1. A shooting video game machine comprising:

a mock gun with a trigger;

display means which presents characters on a monitor to form a game playing display while presenting a bullet traveling in a predetermined direction within the game playing display in synchronization with the pulling of the trigger;

hit determining means for determining whether the bullet hits a character on the game playing display;

proximity determining means for determining whether the bullet hits a proximity area juxtaposed to each character; and shooting result display means:

for presenting a hit shooting result within the game playing display when the hit determining means determines that the bullet hits the target;

for presenting a proximity shooting result within the game playing display when the proximity determining means determines that the bullet hits the proximity area of the character and the hit determining means determines that the bullet hits no character; and for presenting a hit shooting result within the game playing display when the proximity determining means determines that a predetermined plural number of bullets have hit the proximity area of the same character and the hit determining means determines that the last said plural number of bullets have not hit said same character.

2. A shooting video game machine according to claim 1 wherein said hit shooting result and said proximity shooting result have at least one common display element.

3. A shooting video game machine according to claim 2 wherein said at least one common display element represents a smoke screen.

4. A shooting video game machine according to claim 1 wherein said hit shooting result and said proximity shooting result are different from one another.

5. A shooting video game machine according to claim 1 wherein said proximity area is a predetermined area such that said proximity shooting result represents a near miss of the character.

6. A shooting result presentation method of a shooting video game machine which presents characters on a monitor to form a game playing display while presenting a bullet traveling in a predetermined direction within the game playing display in synchronization with the pulling of the trigger, the method comprising the steps of:

determining if the bullet hits a character;

presenting a hit shooting result within the game playing display when it is determined that the bullet hits the character;

determining if the bullet hits a proximity area juxtaposed to the character;

presenting a proximity shooting result within the game playing display when it is determined that the bullet hits no character but hits the proximity area of the character; and presenting a hit shooting result within the game playing display when it is determined that a predetermined plural number of propelled objects have hit the proximity area of the same character.

7. A shooting result presentation method of a shooting video game machine according to claim 6 wherein said hit shooting result and said proximity shooting result have at least one common display element.

8. A shooting result presentation method of a shooting video game machine according to claim 7 wherein said at least one common display element represents a smoke screen.

9. A shooting result presentation method of a shooting video game machine according to claim 6 wherein said hit shooting result and said proximity shooting result are different from one another.

10. A shooting result presentation method of a shooting video game machine according to claim 6 wherein said proximity area is a predetermined area such that said proximity shooting result represents a near miss of the character.

11. A video game machine comprising a mock simulated propelling device with a release operated by a video game player, display means which presents characters on a monitor to form a game playing display while presenting a propelled object traveling in a predetermined direction within the game playing display in synchronization with the operation of the release device by the video game player, proximity determining means for determining that the propelled object hits a predetermined proximity area juxtaposed to each character, result display means for presenting a proximity result within the game playing display when the proximity determining means determines that the propelled object hits the proximity area, a hit determining means for determining whether the propelled object hits the characters on the game playing display, wherein the proximity determining means determines whether the propelled object hits the proximity area of the character when the hit determining unit determines that the propelled object hits none of the characters, and wherein the result display means causes a strike display to be presented when the hit determining means determines that the propelled object hits any of the characters and causes a proximity screen display to be presented when the proximity determining means determines that the propelled object hits the proximity area of any of the characters, the result display means causing the character to change to a strike display when the proximity determining means determines that a predetermined plural number of propelled objects hit the proximity area of the same character.

12. A video game machine according to claim 11, wherein the characters include moving characters.

13. A result presentation method of a video game machine which presents characters on a monitor to form a game playing display while presenting a propelled object traveling in a predetermined direction within the game playing display in synchronization with the release of the propelled object, the method comprising determining that the propelled object hits a predetermined proximity area juxtaposed to each character, presenting a proximity result within the game playing display when it is determined that the propelled object hits the proximity area, and presenting a strike display when it is determined that a predetermined plural number of propelled objects hit the proximity area of the same character.

14. A result presentation method of a video game according to claim 13, wherein the characters include moving characters.

15. A result presentation method of a video game according to claim 13 comprising the step of determining whether the propelled object hits the characters on the game playing display prior to the determination of whether the propelled object hits the proximity area of the character, the step of determining whether the propelled object hits the proximity area of the character when it is determined that the propelled object hits none of the characters, and the step of causing a strike display to be presented when it is determined that the propelled object hits any of the characters and causing a proximity screen display to be presented when it is determined that the bullet hits the proximity area of the character.

* * * * *